(12) United States Patent  
Urbanek

(10) Patent No.: US 8,868,064 B1  
(45) Date of Patent: Oct. 21, 2014

(54) MOBILE DEVICE METRICS MANAGEMENT

(75) Inventor: Robert E. Urbanek, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 13 days.

(21) Appl. No.: 13/293,104

(22) Filed: Nov. 9, 2011

(51) Int. Cl.
| | |
|---|---|
| H04W 24/00 | (2009.01) |
| H04B 7/00 | (2006.01) |
| H04B 17/00 | (2006.01) |
| H04L 1/00 | (2006.01) |
| H04L 12/28 | (2006.01) |

(52) U.S. Cl.
USPC ........ 455/423; 455/519; 455/67.11; 370/252; 370/412

(58) Field of Classification Search
CPC .................................................... H04W 24/00
USPC ........................................................ 455/423
See application file for complete search history.

(56) References Cited

U.S. PATENT DOCUMENTS

| | | | | |
|---|---|---|---|---|
| 7,881,319 | B2 * | 2/2011 | Dobson et al. ................. | 370/412 |
| 2004/0033799 | A1 * | 2/2004 | Fontius ........................... | 455/423 |
| 2004/0225381 | A1 * | 11/2004 | Ritz et al. ........................ | 700/26 |
| 2006/0203738 | A1 * | 9/2006 | Fok et al. ........................ | 370/252 |
| 2007/0287387 | A1 * | 12/2007 | Keum et al. .................. | 455/67.11 |
| 2008/0263398 | A1 * | 10/2008 | Mori et al. ........................ | 714/25 |
| 2009/0106278 | A1 * | 4/2009 | Ramacher et al. ............. | 707/100 |
| 2009/0163197 | A1 * | 6/2009 | Martin et al. .................. | 455/423 |
| 2010/0003967 | A1 * | 1/2010 | Datta et al. ................. | 455/412.1 |
| 2010/0167658 | A1 * | 7/2010 | Hoffman ..................... | 455/67.11 |
| 2010/0323742 | A1 * | 12/2010 | Allen et al. ...................... | 455/519 |
| 2011/0010358 | A1 * | 1/2011 | Zane et al. ...................... | 707/714 |
| 2011/0039571 | A1 * | 2/2011 | Bodine et al. .............. | 455/456.1 |
| 2012/0053778 | A1 * | 3/2012 | Colvin et al. ................ | 701/29.4 |
| 2013/0053023 | A1 * | 2/2013 | Meredith et al. .............. | 455/423 |

FOREIGN PATENT DOCUMENTS

JP          2007-042082        *   6/2006

* cited by examiner

*Primary Examiner* — Timothy Pham

(57) ABSTRACT

A method of troubleshooting a mobile communication system comprising collecting, by a mobile communication device, data of pre-selected metrics of the mobile communication device in a queue of the mobile communication device; processing, by the mobile communication device, the data in the queue; storing, by the mobile communication device, the processed data in a memory of the mobile communication device; discarding, by the mobile communication device, a portion of previously-stored data in the memory, when the memory is full; sending, by the mobile communication device, the data from the memory to a server computer; analyzing, by the server computer, the data of the mobile communication device; and troubleshooting the mobile communication system, based on the analysis.

20 Claims, 5 Drawing Sheets

MOBILE DEVICE METRICS MANAGEMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Users of mobile devices may occasionally experience problems with their mobile devices and/or the services provided thereto. The manufacturer of, and/or the service provider for, the mobile device may attempt to address the problems, based on information from the users. Users may not provide sufficient and/or accurate information to allow for efficient system diagnosis, when describing the problems.

SUMMARY

In an embodiment, a method of troubleshooting a mobile communication system is disclosed. The method comprises collecting, by a mobile communication device, data of a metric of the mobile communication device in a queue of the mobile communication device; processing, by the mobile communication device, the data in the queue; storing, by the mobile communication device, the processed data in a memory of the mobile communication device; discarding, by the mobile communication device, a portion of previously-stored data in the memory, when the memory is full; sending, by the mobile communication device, the data from the memory to a server computer; analyzing, by the server computer, the data of the mobile communication device; and troubleshooting the mobile communication system, based on the analysis.

In an embodiment, a system for troubleshooting a mobile communication system is disclosed. The system comprises a processor; a transceiver; a first memory; an application stored in the first memory that is operable to process data of metrics of the mobile communication device; a second memory configured to store, in a circular data structure, the processed data of the mobile communication device metrics; and a server computer configured to identify a potential issue associated with the mobile communication system and receive the processed data of multiple mobile communication devices that are relevant to the potential issue comprising a processor; a server computer memory; an application stored in the server computer memory that is operable to analyze the data of the multiple mobile communication devices.

In an embodiment, a system for troubleshooting a mobile communication system is disclosed. The system comprises a plurality of mobile communication devices and a server computer. Each mobile communication device comprises a processor, a transceiver, a memory, an application stored in the memory that is operable to process metrics of the mobile communication device and to store the processed metrics in a circular data structure in the memory. The server computer comprises a processor, a server memory, and a diagnostic application stored in the server memory that is operable to identify a potential issue associated with the mobile communication system, to select a subset of the plurality of mobile communication devices from among the plurality of mobile communication devices based on a criteria associated with the potential issue, to receive the processed metrics from the subset of mobile communication devices of multiple mobile communication devices, and to analyze the processed metrics of the multiple mobile communication devices.

In an embodiment, a system for troubleshooting a mobile communication device is disclosed. The system comprises a processor; a transceiver; a first memory; a first application stored in the first memory that is operable to process data of metrics of the mobile communication device; a second memory configured to store, in a circular data structure, the processed data of the mobile communication device metrics; and a second application stored in the first memory that is operable to analyze the data of the mobile communication device metrics stored in the second memory and self-diagnose issues with the mobile communication device that are identified by the analyzing.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
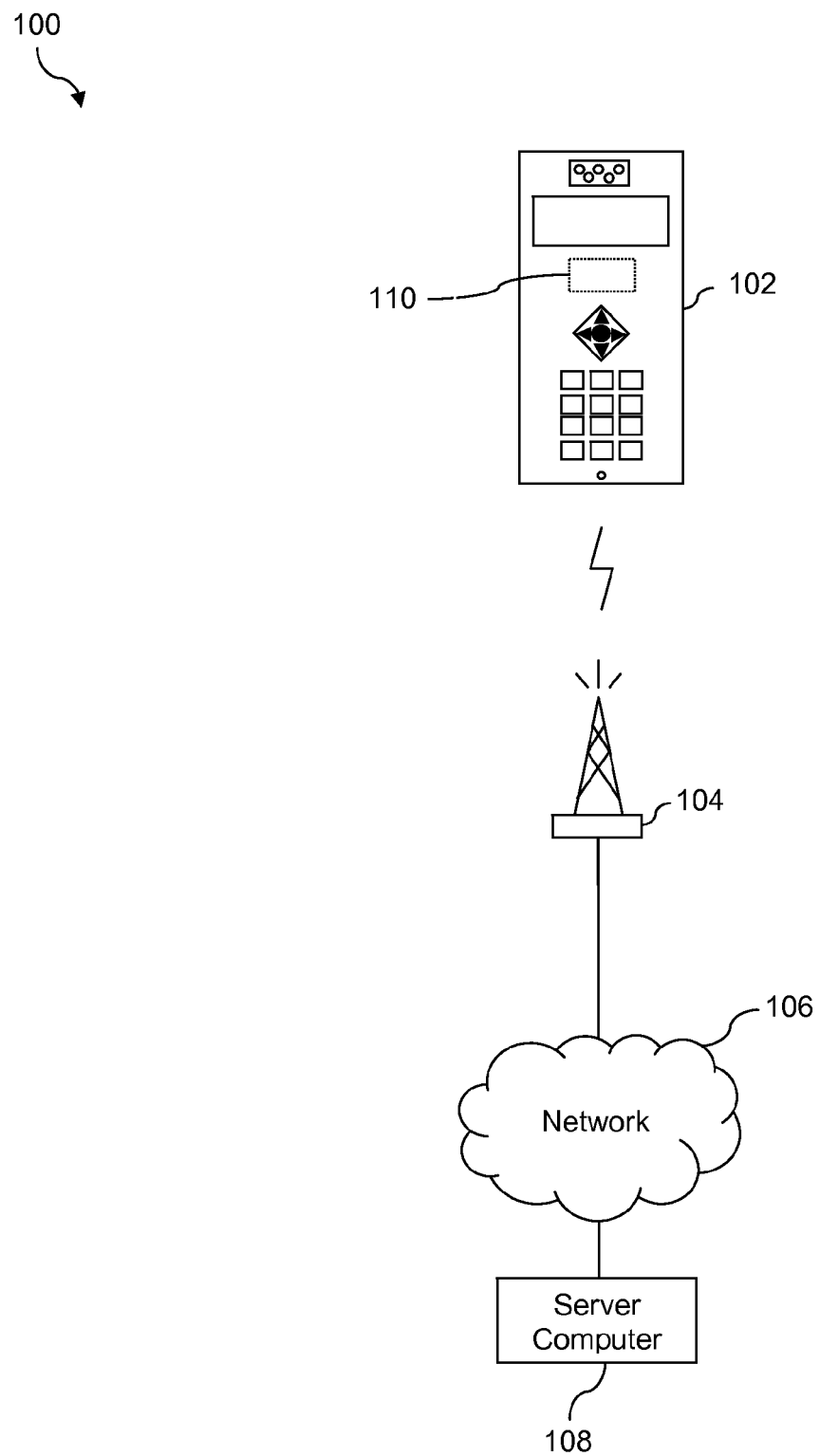
FIG. 1 illustrates a wireless communication system, according to an embodiment of the disclosure.

It should be understood at the outset that, although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In an embodiment, a system and methods for troubleshooting a mobile communication system are disclosed. The system comprises a method of collecting, in an ongoing manner, metrics associated with the operation of a mobile communication device and the communication systems associated thereto. When a mobile communication device such as a mobile phone initiates a process, for example a phone call, the system and methods provide for collecting metrics associated with the call. Various metrics may be pre-determined and specified for capture, as may be suitable for a given system or situation. For example, call initiation time, duration, termination time, whether or not the call terminated intentionally or was dropped, whether or not the phone locked up during the call, and data of other relevant metrics may be captured in a queue on the mobile phone. When the call is terminated, via whatever means, the data in the queue may be processed by an application on the mobile phone. Processing may include compressing or compacting the data, discarding the data if it does not indicate any problems, discarding duplicate data, and the like. Processing may facilitate improved storage of data by making data more compact, such that it occupies less space in the memory of the mobile phone, thereby permitting the storage of more data. In some contexts, the resulting data may be referred to as metrics data or processed metrics.

The processed data may then be stored in an onboard memory of the mobile phone, in a circular data structure. An amount of resident memory on the mobile phone may be designated for this function, in order to retain data of a given amount of time. The circular data structure may be such that the oldest data that is currently resident in the memory may be overwritten, erased, displaced, or otherwise removed from the memory and the newer data (e.g. the data coming from the queue) may be stored therein. In this manner, a rolling collection of data may be stored in a memory of the mobile phone and may function as a record of events, in terms of mobile phone operations.

The stored data then may be accessed and analyzed, and may be used to troubleshoot or otherwise diagnose problems encountered by the mobile device and/or the systems (e.g. wireless networks) that the mobile phone utilizes during various operations of the mobile phone. This, in effect, provides a "breadcrumb trail" of recent events and/or operations associated with the mobile phone, which may be helpful in determining causative factors associated with problems that may arise. The systems and method of the disclosure provide a function such that problems associated with a mobile communication device and the systems utilized thereby may be diagnosed by analyzing the captured data of operations that led up to the problem/problems in question.

In an embodiment, the data stored in the memory of the mobile device may be analyzed by an application of the mobile device, which also may be stored in a memory of the mobile device. The application may be executed by a processor of the mobile device. In an alternative embodiment, the data may be transferred or sent to a server computer for analysis. In either embodiment, the analysis may discover problems and/or issues that have occurred with the mobile device and/or the systems utilized thereby, such as the various components associated with wireless and/or wired communications utilized by the mobile device in the course of conducting a variety of operations. After analyzing the data, the aspects of the analysis that indicate there were problems may be investigated and repaired, as necessary. In this manner, troubleshooting may be facilitated by the ongoing data collection provided by the systems and method of the disclosure.

In a present-day scenario, a customer of a service provider may experience a problem with their mobile device. The customer may call a support center of the service provider to complain about the issue. An agent of the support center may ask the customer to describe the problem in as much detail as possible. However, the customer may not be technically equipped to accurately describe the problem, and may therefore provide inaccurate or insufficient information to assist in properly describing the problem. In addition or alternatively, the customer may intentionally or unintentionally exaggerate the problem. For example, out of frustration, the customer may tell the support center agent that her/his mobile device has dropped 50 calls in the past week. This information may not be factual, but may be exaggerated by the customer in an attempt to garner more attention from the support center agent. Other details and/or information pertaining to problems that customers are experiencing may be received by a support center, which may lead the service provider to misdirect resources to track down and fix issues that may not even exist, or that may be over-reported out of customer frustration or confusion.

It may be the case that some service providers may have the ability to "turn on" a monitoring application on a mobile device. In this case, when a customer calls in to complain of an issue, the service provider may activate the monitoring application on the customer's mobile device, and may capture data pertaining to the operation of the mobile device as time moves forward. However, the problem that the customer has experienced may not occur again, and so the data of the historical problem is lost, as the mobile device was not tracking and retaining information when the problem initially occurred, and there is not a record of the issues the customer experienced. By practicing the teachings of the disclosure, the service provider may be able to gather the historical information of a mobile device, as will be described in greater detail herein. This historical data may be used to identify issues a customer has experienced, in order to determine their extent and/or frequency, and may thereby assist in troubleshooting the mobile device and/or any/all supporting systems relating thereto in a manner that is improved over the scenario described herein above.

Turning now to FIG. 1, a wireless communication system 100 is illustrated. Wireless communication system 100 consists of a mobile device 102, a base transceiver station (BTS) 104, a network 106, a server computer 108, and a metrics management device 110. While illustrated as a mobile phone, mobile device 102 may be any form of mobile device such as a mobile phone, a wireless handset, a pager, a personal digital assistant (PDA), or a gaming device. As such, mobile device 102 may be configured to connect wirelessly to a network such as network 106 via, for example, BTS 104. Mobile device 102 thereby may be availed of access to network 106 via BTS 104, and thereby also availed of access to server computer 108, the latter of which may be communicatively coupled to network 106 via wired or wireless connection.

Figure 2:
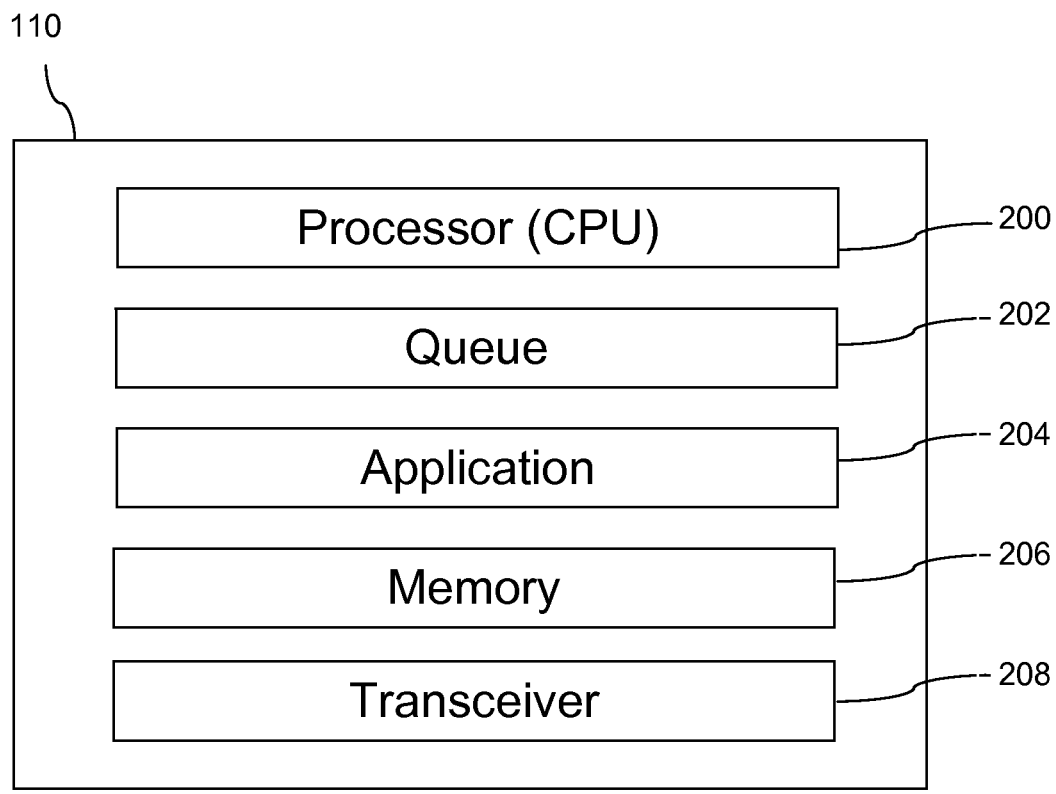
FIG. 2 illustrates a blackbox device, according to an embodiment of the disclosure.

Turning now to FIG. 2, a metrics management device 110 is illustrated. Metrics management device 110 comprises a processor 200, which also may be referred to as a central processing unit (CPU), a queue 202, an application 204, a memory 206, and a transceiver 208. Application 204 may be stored in an onboard memory of mobile device 102, for example memory 206. In an embodiment, when mobile device 102 performs an operation, a predetermined set of metrics may be monitored by, for example, CPU 200 executing application 204 stored in memory 206. Once executed, application 204 may monitor the data of the predetermined metrics, and may temporarily store the data in queue 202. Metrics may be, as an example, duration of a wireless connection, method of contact (e.g. an identifier of a BTS 104), mode of operation, type of transaction (e.g. phone call, internet web page access, or other type of transaction), and any other sort of metric that may be important to monitor and/or record data of, for a given application and/or situation. When the operation is completed, by any means, the data of the metrics which have been stored in queue 202 may be processed.

In an embodiment, application 204 may be further arranged and/or configured to process the data of the metrics. Processing may be any form of data manipulation, for example data compression, data sorting, data compaction, selecting certain data and discarding others, or any other form or method of data handling as may be appropriate for a given situation and/or application. As mobile device 102 may have limited storage capacity, it may be appropriate to discard data that has no value. If, for example, mobile device 102 transacts a phone call, and the phone call is successful, in that no problems were encountered, there may be no reason to record numerous data of relevant metrics. It may be sufficient to merely note that a phone call was made and no errors/problems/issues were noted. If, on the other hand, a phone call was initiated, and the call was dropped several times, it may be appropriate to note the problems in greater detail than when the call was successful. The data relating to the problem/problems encountered may be useful in troubleshooting any issues that may be associated with the dropped calls.

In an embodiment, a wireless service provider may utilize the teachings of the disclosed system to monitor, collect, and/or analyze data of a number of mobile devices that subscribe to their service. When a problem arises, the service provider may download the data from the metrics management devices 110 of the mobile devices 102. For example, a computer such as server computer 108 may, via network 106 and BTS 104, send a request to mobile device 102 to send data from memory 206 of metrics management device 110. The server computer 108 may select a subset from among all the mobile devices 102 based on a criteria associated with the subject problem. For example, if the problem is slow propagation of text messages in rural service areas, the subset of mobile devices 102 may be selected from among (A) those mobile devices 102 that spend at least 80% of their time in a rural service area and (B) those mobile devices 102 of a model type that is associated with high volumes of texting—for example phone models known to be favored by teenage girls. The server computer 108 may then send the request for data from memory 206 of metrics management device 110 to the selected subset of mobile devices 102. In this example the criteria is (A) spending at least 80% of their time in a rural service area and (B) a model type associated with high volumes of texting. Other criteria are contemplated by the present disclosure and may be defined somewhat on an ad hoc basis, for example by inputting from a workstation into a user interface of the server computer 108.

The mobile device 102, via transceiver 208, may send all or a portion of the data stored in memory 206 over a wireless connection to server computer 108. Server computer 108 then may analyze the data by any suitable means. By scrutinizing the data, server computer 108 may determine that, for example, some number of mobile devices 102 have experienced repeated call drops when they were connected to a specific BTS 104. It may be appropriate, therefore, to investigate potential problems with that particular BTS 104 to determine if it is having a problem. In this way, the service provider may be able to track, analyze, and deduce system problems throughout their network by proactively gathering and retaining information of metrics of some number of mobile devices 102 that subscribe to their service. When a problem has been identified, the problem may be solved by adjusting portions of the network and/or by adding additional equipment and/or updating existing equipment.

In an embodiment, the server computer 108 may collect data from the mobile devices 102 or from a selected subset of the mobile devices 102 and store the data in advance of a problem occurrence or without any foreknowledge of a problem. For example, the server computer 108 may collect data from a subset of the mobile devices 102 that operate in a region where a new base transceiver station 104 has recently been brought into service. The server computer 108 may collect data from a subset of the mobile devices 102 that operate in a region that has deployed a new feature in a Beta-version. The server computer 108 may collect such data in the absence of a known or presumed problem on a periodic basis, for example on a basis estimated to collect data from the selected mobile devices 102 before the data is overwritten and lost. Alternatively, the server computer 108 may collect such data on an aperiodic interval. The use of such collections of data and/or performance metrics by the server computer 108 can improve the operational quality of the wireless service provided by a service provider and improve customer satisfaction.

In an embodiment, application 204 may be further configured to analyze data stored in the memory 202 of metrics management device 110. For example, application 204, in a manner similar to that described above for analysis performed by server computer 108, may analyze the data of memory 202 pertaining to the history of operations performed by mobile device 102 to investigate problems and/or issues related thereto. In this manner, metrics management device 110 may permit mobile device 102 to self-diagnose problems. In addition or as an alternative, application 204 may determine whether or not there are any issues associated with the operations of mobile device 102 and may send a summary, such as a report, to server computer 108 of a service provider to inform them of the issue. In an embodiment, the service provider may receive this information and may take an action to address the issue. The service provider, as appropriate, also may poll or inquire of other mobile devices that it serves to determine if there is an issue that is affecting more than just the one reporting mobile device 102.

In an embodiment, CPU 200 may be the processor of mobile device 102, or may be a separate processor of metrics management device 110. Likewise, queue 202, may be separate memory module, a portion of a memory of mobile device 102 that is blocked off for use as a queue, or any other form of memory suitable for a given application or situation. In addition or alternatively, memory 206, and/or transceiver 208 may be those of mobile device 102, which may be arranged and/or configured to perform operations of metrics management device 110, or may be dedicated components of metrics management device 110, as may be suitable in a given application and/or situation.

Figure 3:
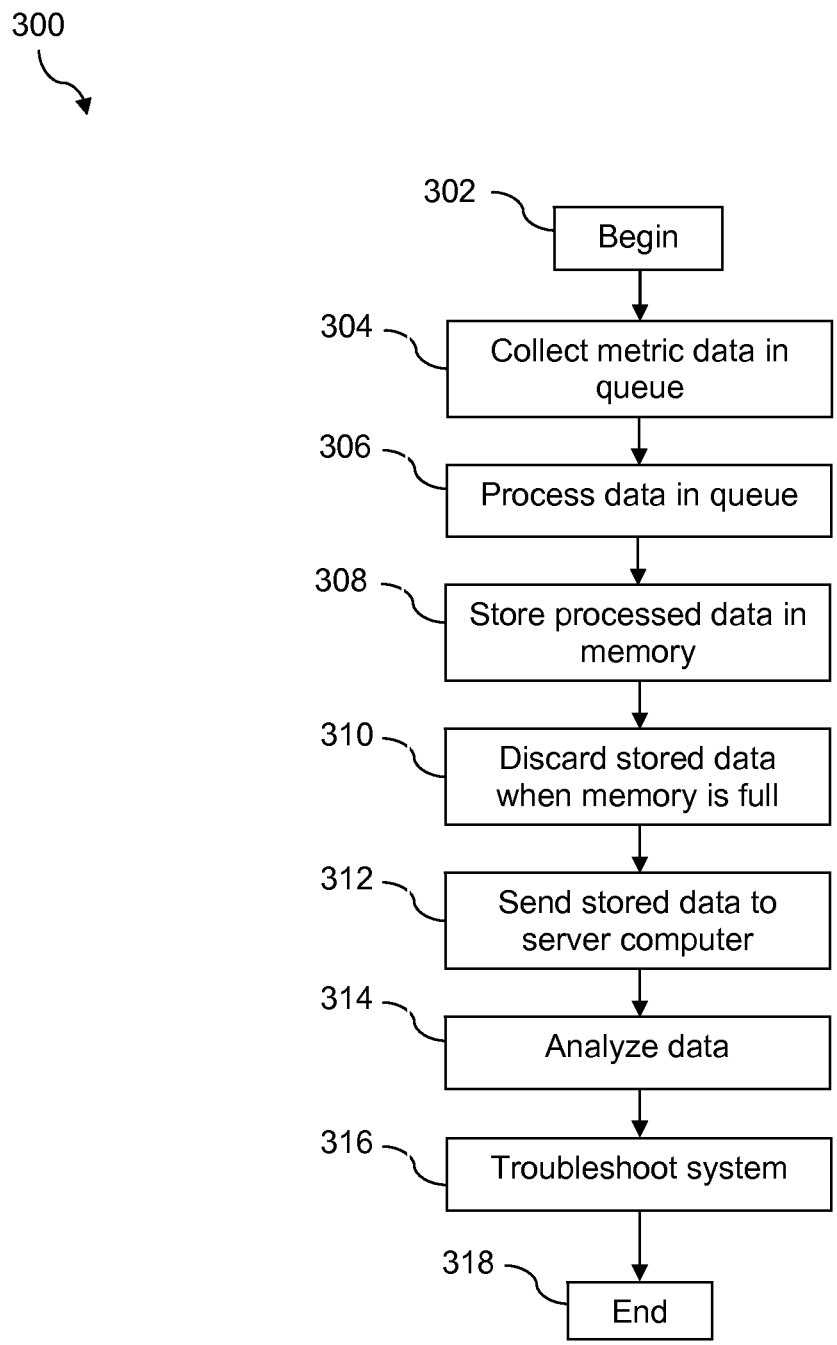
FIG. 3 illustrates a flowchart of a method, according to an embodiment of the disclosure.

FIG. 3 illustrates a method 300 of the disclosure. At step 302, the method begins. At step 304, data of a metric of a mobile device such as mobile device 102 is collected in a queue such as queue 202. Queue 202, which may be implemented in an onboard memory of mobile device 102, may collect information pertaining to an operation that is taking place with mobile device 102. This collection may be done in real-time, as operations are taking place, or may be delayed by any manner or for any time period, as one of skill in the art may appreciate. Any number or type of metric may be predefined, for example, by a service provider of mobile device 102. A service provider may decide that they want to track and/or monitor the frequency of dropped calls experienced by mobile device 102, for example. An application, such as application 204, may observe the calls placed and/or received by mobile device 102 and may determine if any of the calls are dropped. If a call is dropped, application 204 may make note of the event in queue 202 of mobile device 102. In an embodiment, any data of any metrics associated with any operations that are in any way associated with mobile device 102, the support systems and/or structures related thereto, whether hardware-related, software-related, communications-related, or any other metrics as may be appropriate for a given situation or circumstance may be collected in queue 202.

At step 306, when the call has terminated, for example by being dropped, the notation of the dropped call that is temporarily stored in queue 202, along with any/all other information stored in queue 202 may be processed. Processing may be of any suitable form, such as for example compacting or compressing the data for more efficient storage. After processing, in step 308 the processed data is transferred into memory 206 for longer-term storage. In step 310, if memory 206 is full, that is to say if there is no more room to store additional data, some of the currently-stored data of memory 206 may be deleted. Deletion of the currently-stored data of memory 206 may be performed by any suitable method known to one of ordinary skill in the art.

In an embodiment, it may be desirable to delete the data of memory 206 in a manner such that it is not retrievable at a later time. For example, the portion of memory 206 to be deleted may be overwritten by new data, overwritten by null data, or other such method of permanently erasing and/or deleting the currently-stored data of memory 206 such that it may not be retrieved. This permanent deletion may be a form of security measure, to prevent unauthorized acquisition of data, or may simply be a means of freeing up memory for additional storage needs. In step 312, the newer, processed data of queue 202 may be sent to and stored in memory 206 such that "older data" is, essentially, pushed out of memory 206. In this manner, memory 206, in an ongoing fashion, may always contain the most recently-acquired data, along with a history of data for a period or quantity that may be determined by any suitable means, and may therefore provide a historical record of events associated with operations of mobile device 102. This form of keeping a "rolling record" may be referred to as a circular data structure. Alternatively, this form of keeping a "rolling record" may be referred to as collection ahead, for example collection ahead of any problem or specific request.

In an embodiment, a service provider may provision a number of mobile devices and/or a selected set of mobile devices, such as mobile device 102, to capture and record data pertaining to any number of metrics of operations of mobile devices 102, and may use this data to troubleshoot issues and/or problems associated with the mobile devices 102 and/or the systems that provide and/or support the operations.

In step 312, the data of memory 206 may be sent to a server computer, such as server computer 108. Server computer 108 may be a server computer of a service provider of wireless communications service for mobile device 102. The server computer may solicit the data of memory 206 by requesting it from mobile device 102. For example, server computer 108 may send a message to mobile device 102, requesting that mobile device 102 send the data of memory 206 to server computer 108. Alternatively, mobile device 102 may be configured to periodically send the data of memory 206 to server computer 108, wherein the period may be a period of time, an amount of data store, or other period, as may be determined by a service provider for a given need.

In step 314, the data of memory 206 that has been sent to server computer 108 may be analyzed. For example, an agent of the service provider may look at the data of memory 206 of multiple mobile devices 102 and determine that there are issues with the hardware of mobile devices 102, such as a problem with the keyboard or other components of mobile device 102. The agent may analyze the data in any suitable manner, for example sorting, filtering, ranking, and/or any manner of analyzing data. The agent of the service provider may then, in step 316, take appropriate steps to troubleshoot the issues and hopefully to resolve them in a timely manner. Such steps may include, but are not limited to opening a trouble ticket, downloading new software and/or firmware to the mobile device, upgrading the mobile device in another manner, downloading a current preferred roaming list (PRL), or other steps that may be suitable for troubleshooting the issues. At step 318, the method ends. This method may therefore result in an improved customer experience, as opposed to the scenarios that may take place without the teachings of the disclosure.

Figure 4:
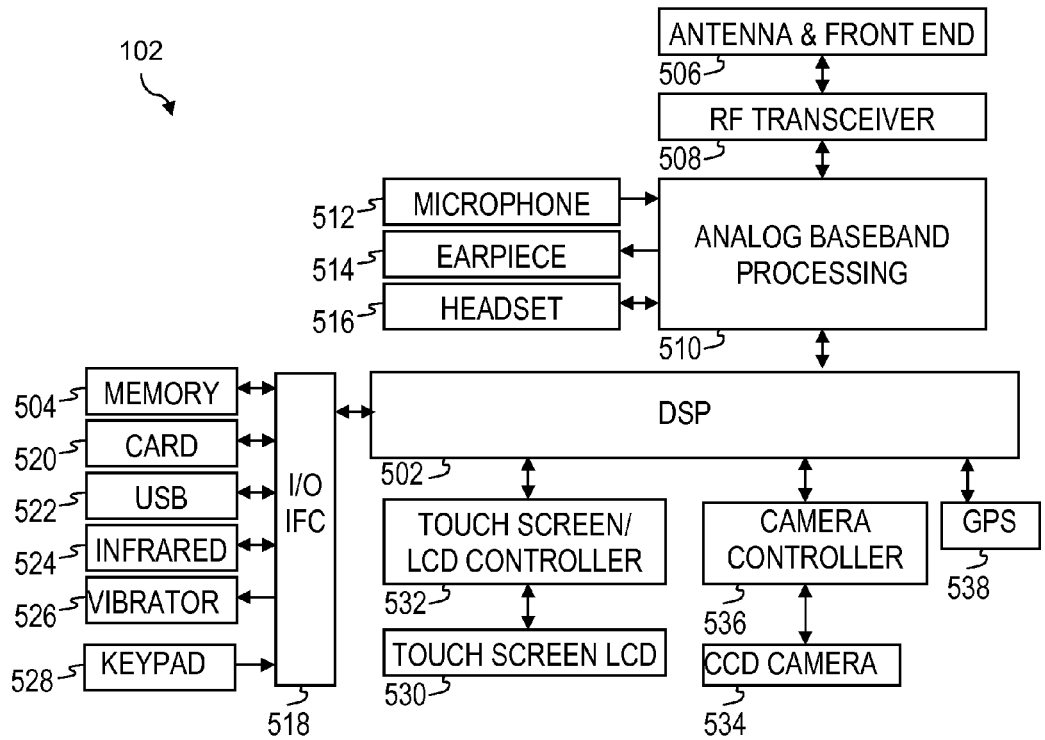
FIG. 4 illustrates a block diagram of a mobile device, according to an embodiment of the disclosure.

FIG. 4 shows a wireless communications system including the mobile device 102. FIG. 4 shows a block diagram of the mobile device 102. While a variety of known components of handsets 102 are depicted, in an embodiment a subset of the listed components and/or additional components not listed may be included in the mobile device 102. The mobile device 102 includes a digital signal processor (DSP) 502 and a memory 504. As shown, the mobile device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 102 may include another kind of display that does not provide a touch sensitive screen. In an embodiment, the DSP 502 may communicate directly with the memory 504 without passing through the input/output interface 518. Additionally, in an embodiment, the mobile device 102 may comprise other peripheral devices that provide other functionality.

The DSP 502 or some other form of controller or central processing unit operates to control the various components of the mobile device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 102 to function as a peripheral device to exchange information with a personal computer or other computer system. The infrared port 524 and other optional ports such as a Bluetooth interface or an IEEE 802.11 compliant wireless interface may enable the mobile device 102 to communicate wirelessly with other nearby handsets and/or wireless base stations.

The keypad 528 couples to the DSP 502 via the interface 518 to provide one mechanism for the user to make selections, enter information, and otherwise provide input to the mobile device 102. Another input mechanism may be the touch screen LCD 530, which also may display text and/or graphics to the user. The touch screen LCD controller 532 couples the DSP 502 to the touch screen LCD 530. The GPS sensor 538 is coupled to the DSP 502 to decode global positioning system signals, thereby enabling the mobile device 102 to determine its position.

Figure 5:
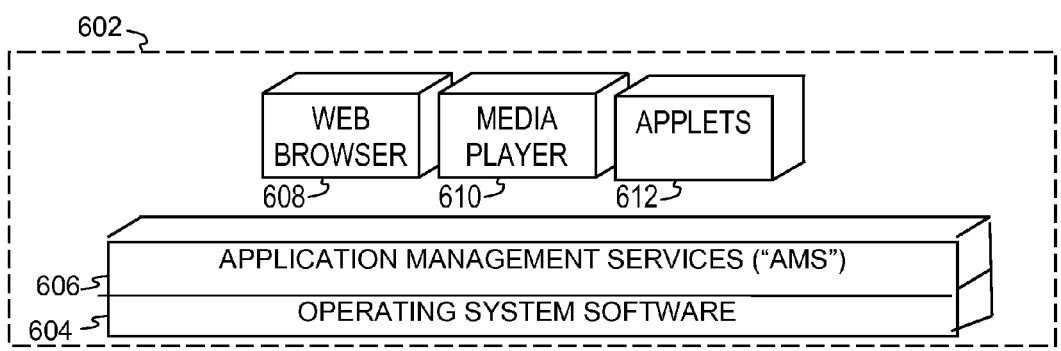
FIG. 5 illustrates a software environment, according to an embodiment of the disclosure.

FIG. 5 illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services ("AMS") 606 that transfer control between applications running on the mobile device 102. Also shown in FIG. 5 are a web browser application 608, a media player application 610, and JAVA applets 612. The web browser application 608 configures the mobile device 102 to operate as a web browser, allowing a user to enter information into forms and select links to retrieve and view web pages. The media player application 610 configures the mobile device 102 to retrieve and play audio or audiovisual media. The JAVA applets 612 configure the mobile device 102 to provide games, utilities, and other functionality.

Figure 6:
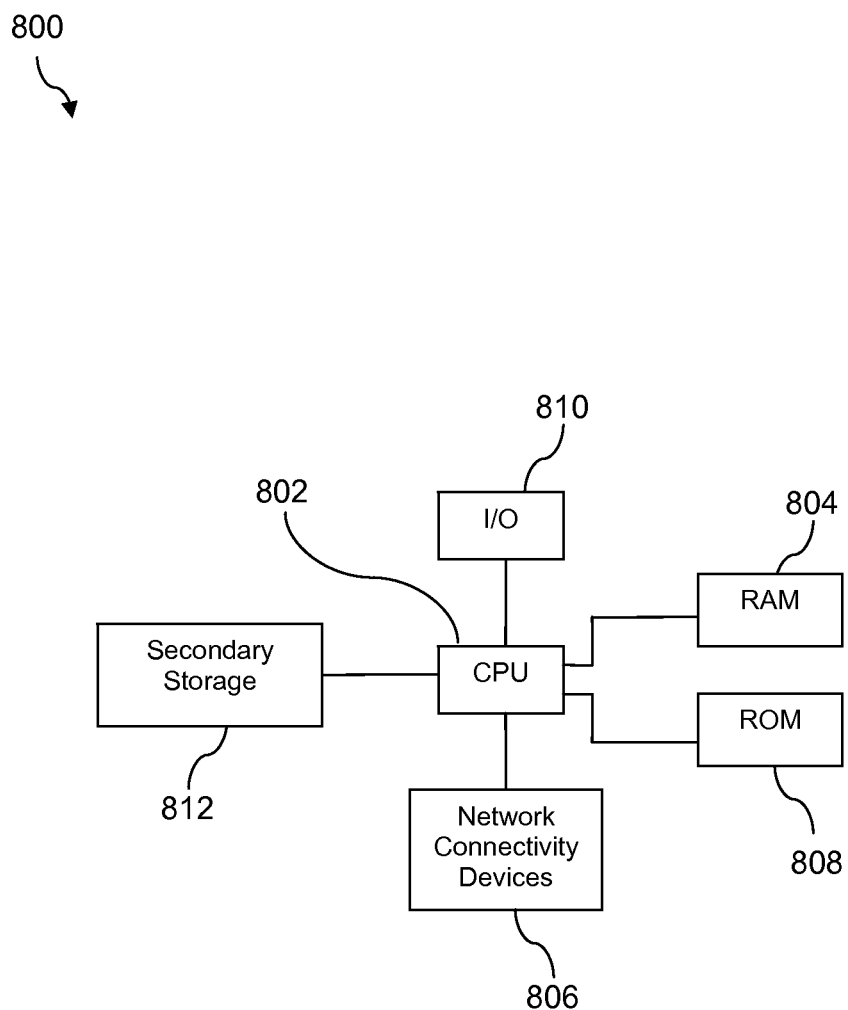
FIG. 6 illustrates a computer system, according to an embodiment of the disclosure.

FIG. 6 illustrates a computer system 800 suitable for implementing one or more embodiments disclosed herein. The computer system 800 includes a processor 802 (which may be referred to as a central processor unit or CPU) that is in communication with memory devices including secondary storage 812, read only memory (ROM) 808, random access memory (RAM) 804, input/output (I/O) devices 810, and network connectivity devices 806. The processor 802 may be implemented as one or more CPU chips.

It is understood that by programming and/or loading executable instructions onto the computer system 800, at least one of the CPU 802, the RAM 804, and the ROM 808 are changed, transforming the computer system 800 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 812 is typically comprised of one or more disk drives or tape drives and is used for non-volatile storage of data and as an over-flow data storage device if RAM 804 is not large enough to hold all working data. Secondary storage 812 may be used to store programs which are loaded into RAM 804 when such programs are selected for execution. The ROM 808 is used to store instructions and perhaps data which are read during program execution. ROM 808 is a non-volatile memory device which typically has a small memory capacity relative to the larger memory capacity of secondary storage 812. The RAM 804 is used to store volatile data and perhaps to store instructions. Access to both ROM 808 and RAM 804 is typically faster than to secondary storage 812. The secondary storage 812, the RAM 804, and/or the ROM 808 may be referred to in some contexts as computer readable storage media and/or non-transitory computer readable media.

I/O devices 810 may include printers, video monitors, liquid crystal displays (LCD's), touch screen displays, keyboards, keypads, switches, dials, mice, track balls, voice recognizers, card readers, paper tape readers, or other well-known input devices.

The network connectivity devices 806 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 806 may enable the processor 802 to communicate with the Internet or one or more intranets. With such a network connection, it is contemplated that the processor 802 might receive information from the network, or might output information to the network in the course of performing the above-described method steps. Such information, which is often represented as a sequence of instructions to be executed using processor 802, may be received from and outputted to the network, for example, in the form of a computer data signal embodied in a carrier wave.

Such information, which may include data or instructions to be executed using processor 802 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 802 executes instructions, codes, computer programs, scripts which it accesses from hard disk, floppy disk, optical disk (these various disk based systems may all be considered secondary storage 812), ROM 808, RAM 804, or the network connectivity devices 806. While only one processor 802 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 812, for example, hard drives, floppy disks, optical disks, and/or other device, the ROM 808, and/or the RAM 804 may be referred to in some contexts as non-transitory instructions and/or non-transitory information.

In an embodiment, the computer system 800 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 800 to provide the functionality of a number of servers that is not directly bound to the number of computers in the computer system 800. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 800, at least portions of the contents of the computer program product to the secondary storage 812, to the ROM 808, to the RAM 804, and/or to other non-volatile memory and volatile memory of the computer system 800. The processor 802 may process the executable instructions and/or data structures in part by directly accessing the computer program product, for example by reading from a CD-ROM disk inserted into a disk drive peripheral of the computer system 800. Alternatively, the processor 802 may process the executable instructions and/or data structures by remotely accessing the computer program product, for example by downloading the executable instructions and/or data structures from a remote server through the network connectivity devices 806. The computer program product may comprise instructions that promote the loading and/or copying of data, data structures, files, and/or executable instructions to the secondary storage 812, to the ROM 808, to the RAM 804, and/or to other non-volatile memory and volatile memory of the computer system 800.

In some contexts, the secondary storage 812, the ROM 808, and the RAM 804 may be referred to as a non-transitory computer readable medium or a computer readable storage media. A dynamic RAM embodiment of the RAM 804, likewise, may be referred to as a non-transitory computer readable medium in that while the dynamic RAM receives electrical power and is operated in accordance with its design, for example during a period of time during which the computer system 800 is turned on and operational, the dynamic RAM stores information that is written to it. Similarly, the processor 802 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of troubleshooting a mobile communication device comprising:

collecting, by a mobile communication device during operation, data of a metric of a functionality of the mobile communication device in a queue of the mobile communication device prior to an occurrence of a specific problem with the mobile communication device, wherein the data of the metric of the functionality of the mobile communication device comprises more than one of a call initiation time, a call duration, a call termination time, a call location, a dropped call occurrence, and a mobile communication device malfunction occurrence;

processing, by the mobile communication device, the data in the queue, wherein processing the data comprises any of compressing the data, discarding duplicate data, and discarding some of the data in response to the some of the data not indicating any problems;

storing, by the mobile communication device, the processed data from the queue in a circular data structure of a non-transitory memory of the mobile communication device;

maintaining, by the mobile communication device, the circular data structure by eliminating older processed data from the circular data structure in the non-transitory memory and adding newer processed data to the circular data structure in the non-transitory memory when the newer processed data is presented;

sending, by the mobile communication device, the processed data currently stored in the circular data structure in the non-transitory memory from the circular data structure of the non-transitory memory to a server computer;

receiving, by the server computer, the processed data sent from the circular data structure in the non-transitory memory of the mobile communication device;

after the occurrence of the specific problem, analyzing, by the server computer, the processed data sent by the mobile communication device to identify the specific problem with the mobile communication device; and based on the analysis, troubleshooting, by the server computer, the specific problem with the mobile communication device, wherein troubleshooting comprises any of opening a trouble ticket, downloading new software to the mobile communication device, downloading new firmware to the mobile communication device, and updating a preferred roaming list.

2. The method of claim 1, wherein collecting the data of the metric of the functionality of the mobile communication device comprises logging parameters associated with an operation of the mobile communication device.

3. The method of claim 2, wherein the contents of the queue are processed and stored in the circular data structure in the non-transitory memory of the mobile communication device when the operation of the mobile communication device is completed.

4. The method of claim 1, further comprising replacing previously-stored data that has been in the circular data structure in the non-transitory memory longer than a pre-determined period of time with newer data.

5. The method of claim 1, wherein analyzing the data sent by the mobile communication device comprises identifying the specific problem with the mobile communication device.

6. The method of claim 5, wherein the specific problem with the mobile communication device comprises at least one of handset malfunctions, communications issues, dropped calls, hardware malfunctions, and software issues.

7. The method of claim 1, wherein troubleshooting the specific problem with the mobile communication device comprises resolving the specific problem with the mobile communication device that is identified by the analyzing.

8. The method of claim 1, further comprising:
identifying, by the server computer, a subset of a plurality of mobile communication devices based on criteria associated with the specific problem,
sending, by the server computer, a request for data to each of the subset of the plurality of mobile communication devices,
in response to the request, receiving, by the server computer, processed data from circular data structures of the subset of the plurality of mobile communication devices, and
analyzing, by the server computer, the received processed data from the circular data structures of the subset of the plurality of mobile communication devices, wherein the server troubleshoots the specific problem with the mobile communication device based at least in part on the analysis of the received processed data from the circular data structures of the subset of the plurality of mobile communication devices.

9. The method of claim 8, wherein the processed data of the subset of the plurality of mobile communication devices includes more than one of a call initiation time, a call duration, a call termination time, a call location, a dropped call occurrence, and a mobile communication device malfunction occurrence.

10. The method of claim 1, wherein the data of the metric of the functionality of the mobile communication device are associated with a network session that is any of a voice communication session, a web browser session, and a data communication session.

11. The method of claim 1, wherein eliminating older processed data from the circular data structure in the non-transitory memory comprises any of overwriting older processed metrics data, erasing older processed metrics data, and displacing the older processed metrics data.

12. A system for troubleshooting a mobile communication device comprising:
a mobile communication device comprising a processor, a transceiver, a queue, a non-transitory memory, an application stored in the non-transitory memory that, upon execution of the processor, configures the processor to:
during operation of the mobile communication device, collect data of a metric of a functionality of the mobile communication device in a queue prior to occurrence of a specific problem with the mobile communication device, wherein the data of the metric of the functionality of the mobile communication device comprises more than one of a call initiation time, a call duration, a call termination time, a call location, a dropped call occurrence, and a mobile communication device malfunction occurrence,
process the data in the queue, wherein processing the data comprises any of data compression, discarding duplicate data, and discarding some of the data in response to the some of the data not indicating any problems,
store and maintain the processed data from the queue in a circular data structure in the non-transitory memory by eliminating older processed data from the circular data structure in the non-transitory memory and adding newer processed data to the circular data structure in the non-transitory memory when the newer processed data of the metrics are presented, and
send the processed data currently stored in the circular data structure from the circular data structure to a server computer; and
a server computer comprising a server processor, a non-transitory server memory, and a diagnostic application stored in the non-transitory server memory that, upon execution of the server processor, configures the server processor to:
receive the processed data sent from the circular data structure of the mobile communication device,
analyze the received processed data sent by the mobile communication device to identify the specific problem with the mobile communication device, and
based on the analysis of the received processed data, troubleshoot the specific problem with the mobile communication device, wherein troubleshooting comprises any of opening a trouble ticket, downloading new software to the mobile communication device, downloading new firmware to the mobile communication device, and updating a preferred roaming list.

13. The system of claim 12, wherein the application of the mobile communication device is further configured, upon execution by the processor, to discard a portion of the older processed data of the metrics from the circular data structure of the mobile communication device non-transitory memory when the non-transitory memory is full.

14. The system of claim 13, wherein discarding the portion of the older processed data of the metrics from the mobile communication device non-transitory memory comprises any of overwriting the portion of the older processed data of the metrics stored in the mobile communication device non-transitory memory, erasing the portion of the older processed data of the metrics stored in the mobile communication device non-transitory memory, and displacing the portion of the older processed data of the metrics stored in the mobile communication device non-transitory memory.

15. The system of claim 12, wherein analysis on the server of the processed data of the metrics of the mobile communication device comprises identifying the specific problem with the mobile communication device, based on the processed data of the metrics of the mobile communication device.

16. The system of claim 12, wherein the metrics of the mobile communication device are parameters of operation of the mobile communication device.

17. The system of claim 12, wherein the data of the metric of the functionality of the mobile communication device are associated with a network session that is any of a voice communication session, a web browser session, and a data communication session.

18. The system of claim 12, wherein the server computer is further configured to:
    identify a subset of a plurality of mobile communication devices based on criteria associated with the specific problem,
    send a request for data to each of the subset of the plurality of mobile communication devices,
    in response to the request, receive processed data from circular data structures of the subset of the plurality of mobile communication devices, and
    analyze the received processed data from the circular data structures of the subset of the plurality of mobile communication devices, wherein the server troubleshoots the specific problem with the mobile communication device based at least in part on the analysis of the received processed data from the circular data structures of the subset of the plurality of mobile communication devices.

19. The system of claim 18, wherein the processed data of the subset of the plurality of mobile communication devices includes more than one of a call initiation time, a call duration, a call termination time, a call location, a dropped call occurrence, and a mobile communication device malfunction occurrence.

20. The system of claim 12, wherein the processor of the mobile communication device eliminates older processed data from the circular data structure in the non-transitory memory by any of overwriting older processed metrics data, erasing older processed metrics data, and displacing the older processed metrics data.

\* \* \* \* \*